US007549597B2

(12) United States Patent
Tsai et al.

(10) Patent No.: US 7,549,597 B2
(45) Date of Patent: Jun. 23, 2009

(54) GRAPHICAL INDICATOR

(75) Inventors: Yao-Hung Tsai, Chu Pei (TW); Li-Ching Chen, Chu Pei (TW)

(73) Assignee: SONIX Technology Co., Ltd., Hsinchu (TW)

( * ) Notice: Subject to any disclaimer, the term of this patent is extended or adjusted under 35 U.S.C. 154(b) by 0 days.

(21) Appl. No.: 11/723,338

(22) Filed: Mar. 19, 2007

(65) Prior Publication Data

US 2007/0246547 A1 Oct. 25, 2007

(30) Foreign Application Priority Data

Apr. 14, 2006 (TW) .............................. 95113473 A

(51) Int. Cl.
*G06K 21/06* (2006.01)

(52) U.S. Cl. ........................ 235/494; 235/454; 235/487

(58) Field of Classification Search ................. 235/494, 235/454

See application file for complete search history.

(56) References Cited

U.S. PATENT DOCUMENTS 4,924,078 A 5/1990 Sant'Anselmo et al.
5,612,524 A 3/1997 Sant'Anselmo et al.
6,533,182 B1 * 3/2003 Ohshima et al. ............ 235/494
6,548,768 B1 4/2003 Pettersson et al.
6,663,008 B1 12/2003 Pettersson et al.
6,674,427 B1 1/2004 Pettersson et al.
7,172,131 B2 2/2007 Pettersson et al.
7,248,250 B2 7/2007 Pettersson et al.
7,281,668 B2 10/2007 Pettersson et al.
2002/0125319 A1 * 9/2002 Sasaki et al. ................ 235/454
2005/0173544 A1 * 8/2005 Yoshida ...................... 235/494
2006/0076416 A1 4/2006 Pettersson
2007/0164110 A1 7/2007 Yoshida

FOREIGN PATENT DOCUMENTS

CN 1326017 C 7/2007
CN 100361144 C 1/2008
JP 2007-011890 A 1/2007
KR 10-20050028040 A 3/2005
WO WO2004/029871 A1 4/2004
WO WO2004/084125 A1 9/2004

* cited by examiner

*Primary Examiner*—Michael G Lee
*Assistant Examiner*—Rafferty Kelly
(74) *Attorney, Agent, or Firm*—Muncy, Geissler, Olds & Lowe, PLLC

(57) ABSTRACT

A graphical indicator provided on the surface of an object to represent index information includes a content part and a header part. The content part is spread with a plurality of micro-units and divided into a plurality of state zones. Each state zone is spread with one micro-unit and equally divided into multiple hypothetical sections. The micro-unit is placed in any of the hypothetical sections to form different candidate states. The header part is spread with a plurality of micro-units that are specifically arranged to provide header information used to recognize the graphical indicator.

21 Claims, 13 Drawing Sheets

GRAPHICAL INDICATOR

BACKGROUND OF THE INVENTION (a) Field of the Invention

The invention relates to a graphical indicator that is provided on the surface of an object and carries index information recognized by pattern/image recognition process.

(b) Description of the Related Art

FIG. 1 shows a schematic diagram illustrating a graphical indicator 102 provided on the surface 100 of an object. The graphical indicator 102 typically consists of a plurality of graphical micro-units, and the graphical indicator 102 and the primary pattern or text 104 (such as the text "APPLE" shown in FIG. 1) that carries main information coexist on the surface 100 of an object such as a paper sheet. Since the graphical micro-units are so tiny as to be visually negligible or be sensed as background materials by human eyes, they do not interfere with the recognition of the main information carried by the primary pattern or text 104.

FIG. 2 shows a schematic diagram illustrating an electronic system 110 used to retrieve the information carried by graphical indicators. The electronic system 110 includes an optical device 112, an image-processing device 114, and an output device 116, and all of them are wired to each other or coupled with each other via wireless communication. The optical device 112 captures an enlarged image of the surface on which the graphical indicators 102 are formed, and then the image-processing device 114 fetches the graphical indicators 102 from the enlarged image and transforms them into digital data to retrieve the index information carried by the graphical indicators 102. Finally, the output device 116 receives the index information and then outputs the index information in a specific form. Hence, through the provision of the graphical indicators 102, more additional information can be appended to the surface of an object such as a paper sheet.

FIG. 3 shows a schematic diagram illustrating a conventional design of a dot pattern that includes multiple graphical indicators 102. As shown in FIG. 3, each graphical indicator 102 (indicated by dash lines) includes a key dot 202, multiple lattice dots 204, and multiple information dots 206 that are arranged in accordance with a predetermined rule. First, in each graphical indicator 102, a block is defined by a 5×5 matrix of lattice dots 204, and each information dot 206 is disposed neighboring a hypothetical center point of four lattice dots 204 that are arranged in a rectangle. More specifically, within each rectangle constructed by four lattice dots 204, the information dot 206 is placed slightly toward the top, down, left or right side of the hypothetical center point of the rectangle to represent different values recognized by the electronic system 110. The key dot 202, which is the representative point of each graphical indicator 102, is formed by unidirectional shifting the center lattice dot of a 5×5 matrix of lattice dots 204. Thus, the key dot 202 is designed to provide the graphical indicator 102 with a reference orientation when the optical device 112 captures an enlarged image from the surface of an object. Further, the manner where each four lattice dots 204 are arranged in a rectangle may help to correct the possible distortion or deflection of the captured image.

As shown in FIG. 1, since the primary pattern or text 104 that carries main information and the graphical indicator 102 that carries additional index information coexist on the surface of an object, a higher distribution density of micro-units may deteriorate the visual effect and raise the possibility of confusion between the graphical indicator 102 and the primary pattern or text 104. Further, when the graphical indicators 102 are spread on a confined surface area, a great amount of index information to be carried may cause an excess distribution density of micro-units to result in a considerable small space between two adjacent micro-units. This may further deteriorate the visual effect and raise the possibility of confusion, particularly when the micro-units are printed on a paper sheet. Though an approach of reducing the dimension of micro-units may cure this problem, a high-resolution printer must be provided to increase the cost and the complexity on printing the micro-units and the detecting errors of the optical device 112 are both increased. The conventional design such as shown in FIG. 1 always causes an excess distribution density of micro-units to result in the above problems.

BRIEF SUMMARY OF THE INVENTION

Hence, an object of the invention is to provide the design of a graphical indicator capable of solving the problems with the conventional design.

According to the invention, a graphical indicator provided on the surface of an object to represent index information includes a content part and a header part. The content part is spread with a plurality of micro-units and divided into a plurality of state zones. Each state zone is spread with one micro-unit and equally divided into multiple hypothetical sections. The micro-unit is placed in any of the hypothetical sections to form different candidate states. The header part is spread with a plurality of micro-units that are specifically arranged to provide header information used to recognize the graphical indicator.

Through the design of the invention, the graphical indicator allows for a smaller number of dots (smaller dot density) to represent the same data amount as in the conventional design, so it may achieve better visual effect and avoid the confusion between the graphical indicator and the primary text or pattern provided on the surface of an object. Further, in the conventional design, when the graphical indicators are spread on a confined surface area, a great amount of information to be carried may cause an excess distribution density of dots to result in a considerable small space between two adjacent dots. This often causes the difficulty of printing the graphical indicators and errors in the analysis of the image captured by an optical device. However, the low dot distribution density achieved by the invention may solve this problem.

Besides, only four dots are needed to construct a smallest graphical indicator according to the invention. Thus, the dot arrangement of the invention may provide more flexibility when the graphical indicators are affixed on the surface of an object and naturally helps to reduce the dot distribution density.

DETAILED DESCRIPTION OF THE INVENTION

Figure 1:
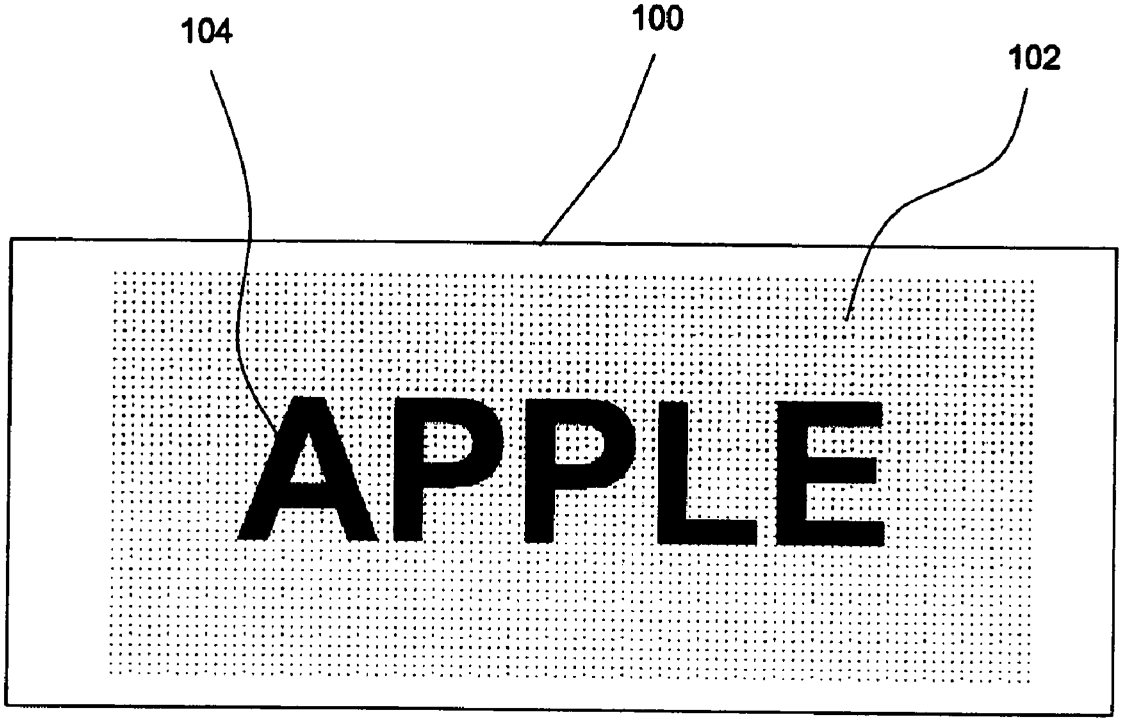
FIG. 1 (Prior Art)
FIG. 1 shows a schematic diagram illustrating a graphical indicator provided on the surface of an object.
Figure 2:
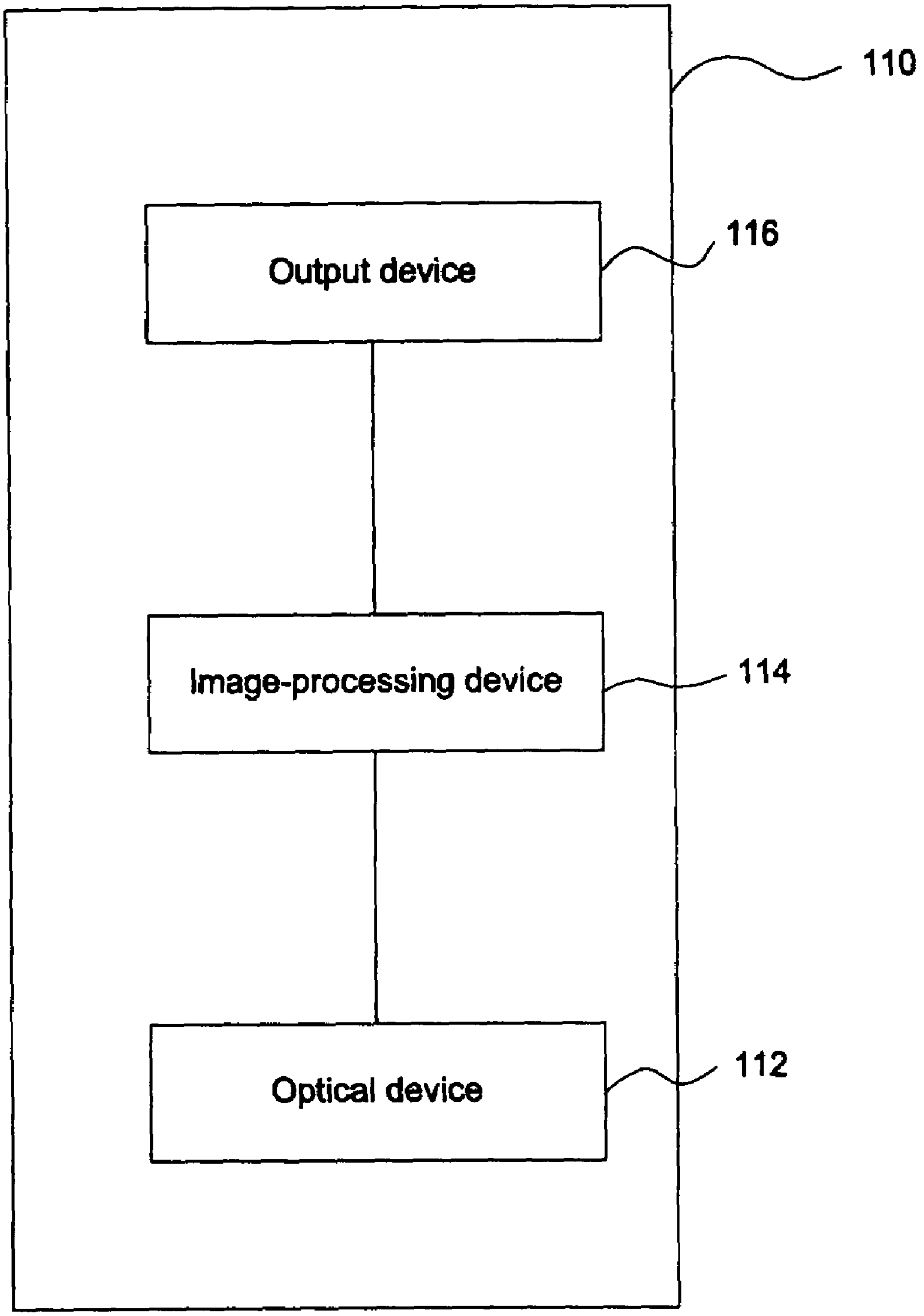
FIG. 2 (Prior Art)
FIG. 2 shows a schematic diagram illustrating an electronic system used to retrieve the information carried by graphical indicators.
Figure 3:
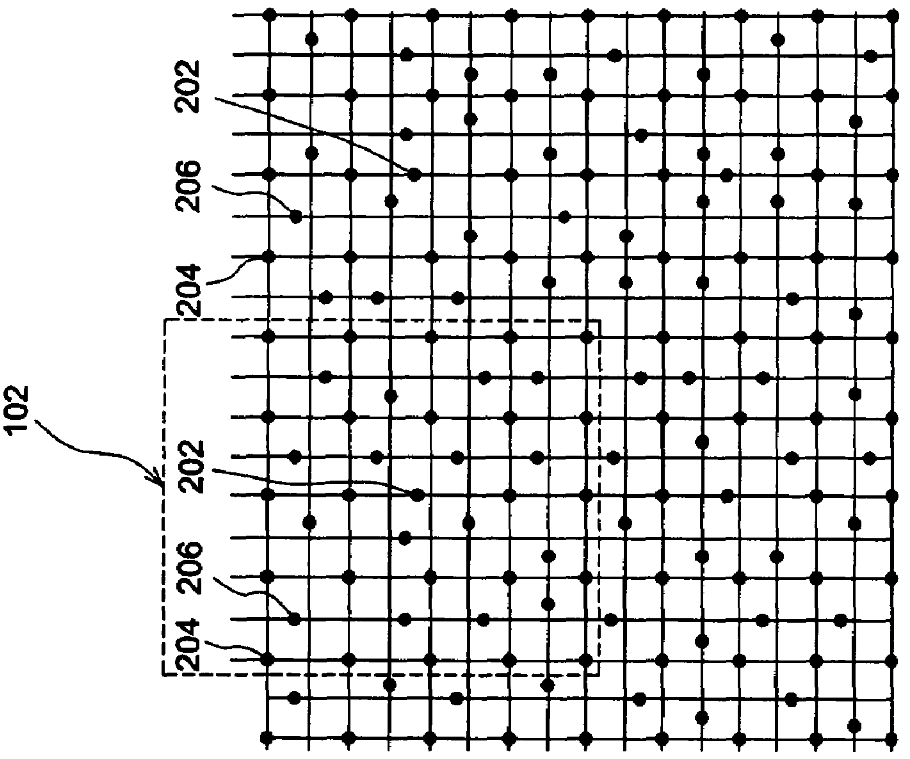
FIG. 3 (Prior Art)
FIG. 3 shows a schematic diagram illustrating a conventional design of a dot pattern that includes multiple graphical indicators.
Figure 4:
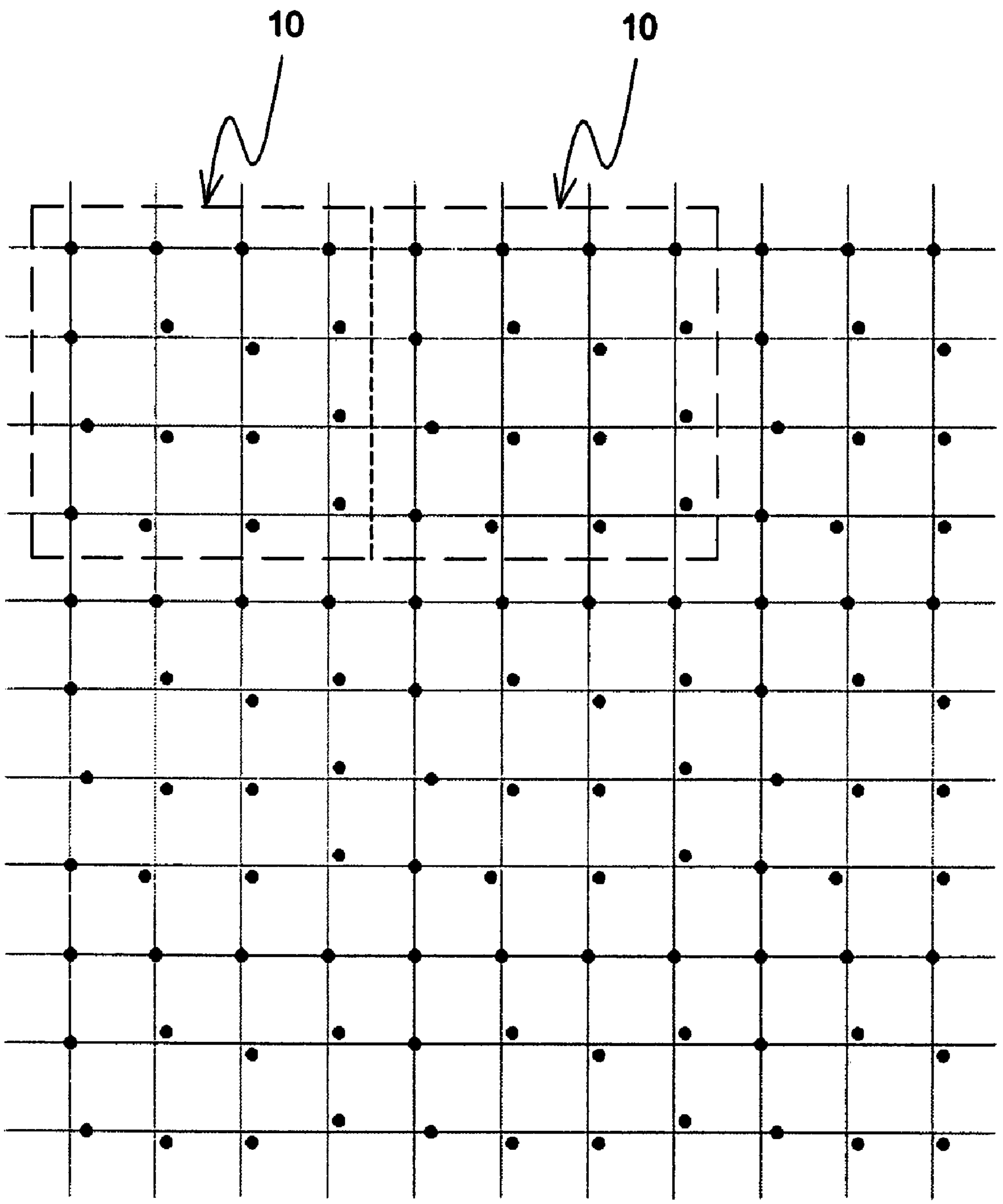
FIG. 4 shows a schematic diagram illustrating an arrangement of multiple graphical indicators according to an embodiment of the invention.
Figure 5:
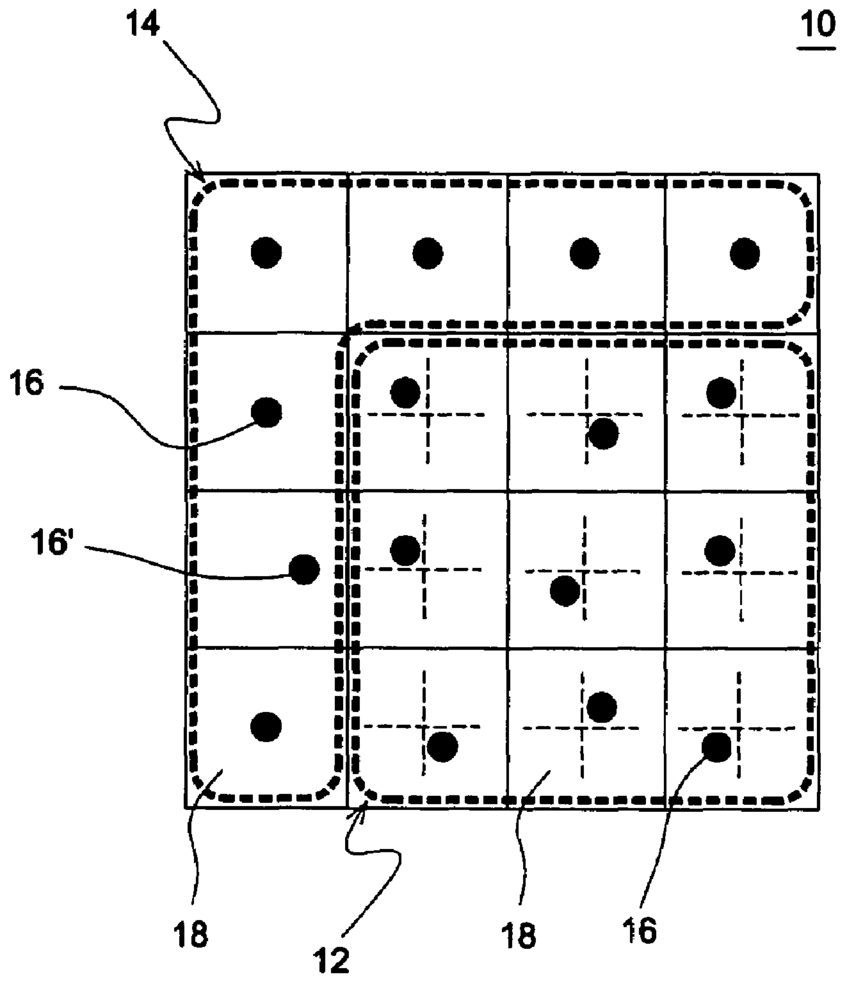
FIG. 5 shows an enlarged view of a graphical indicator for clearly illustrating the design of the invention.
Figure 6:
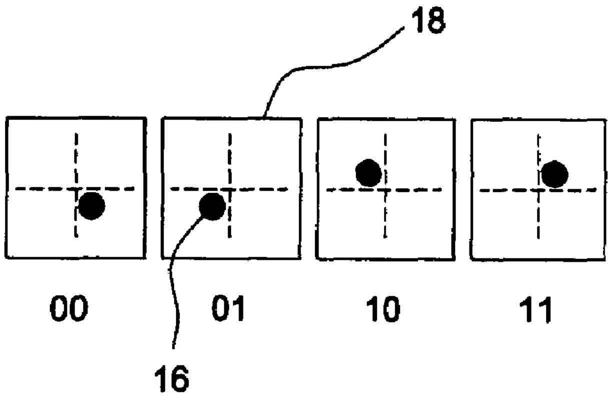
FIG. 6 shows a schematic diagram illustrating the candidate states in one state zone.
Figure 7:
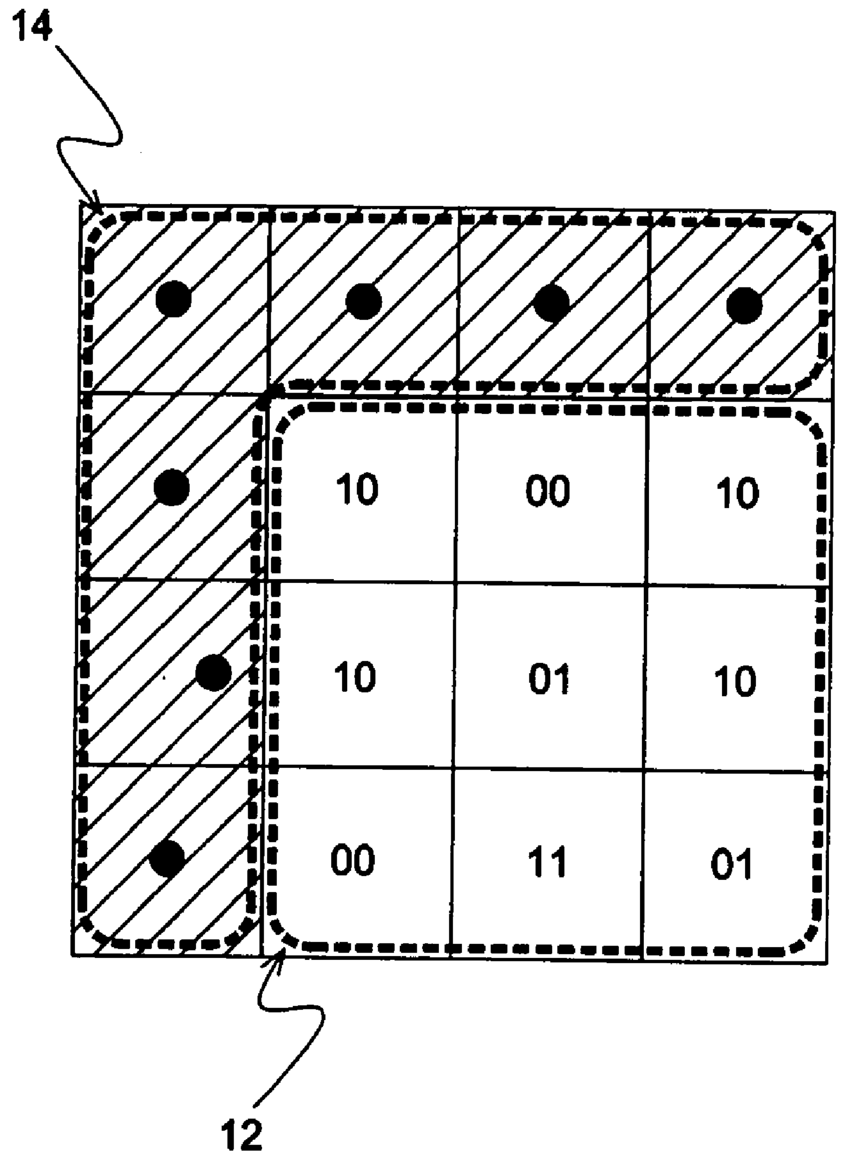
FIG. 7 shows a schematic diagram illustrating a bit array mapping onto the dot arrangement of a content part.

FIG. 4 shows a schematic diagram illustrating an arrangement of multiple graphical indicators 10 according to an embodiment of the invention. FIG. 5 shows an enlarged view of a graphical indicator 10 for clearly illustrating the design of the invention. Referring to FIG. 5, each graphical indicator 10 includes a content part 12 and a header part 14. In this embodiment, each content part 12 is spread with nine micro-units, namely nine dots 16, and is divided into nine state zones 18 arranged in a 3×3 two-dimensional array, so each state zone 18 is spread with one dot 16. According to this embodiment, when a dot 16 is to be placed in one state zone 18, it is placed to deviate from the center of one state zone 18 and toward its upper right, upper left, lower right, or lower left corner. In other words, as shown in FIG. 6, in case each state zone is equally divided into four hypothetical sections, a dot 16 placed in any of the four hypothetical sections may form four candidate states that respectively represent four bit values 00, 01, 10, and 11. Thus, the dot arrangement of the content part 12 maps onto a bit array shown in FIG. 7. Further, it is possible to form $4^9$ (=262144) candidate states in the content part having nine state zones 18, in which 65536 candidate states out of the 262144 candidate states may be taken to correspond to 65536 code points of the Unicode standard. The remaining candidate states may be reserved for another purpose; for example, they may represent checksum code points.

Figure 8:
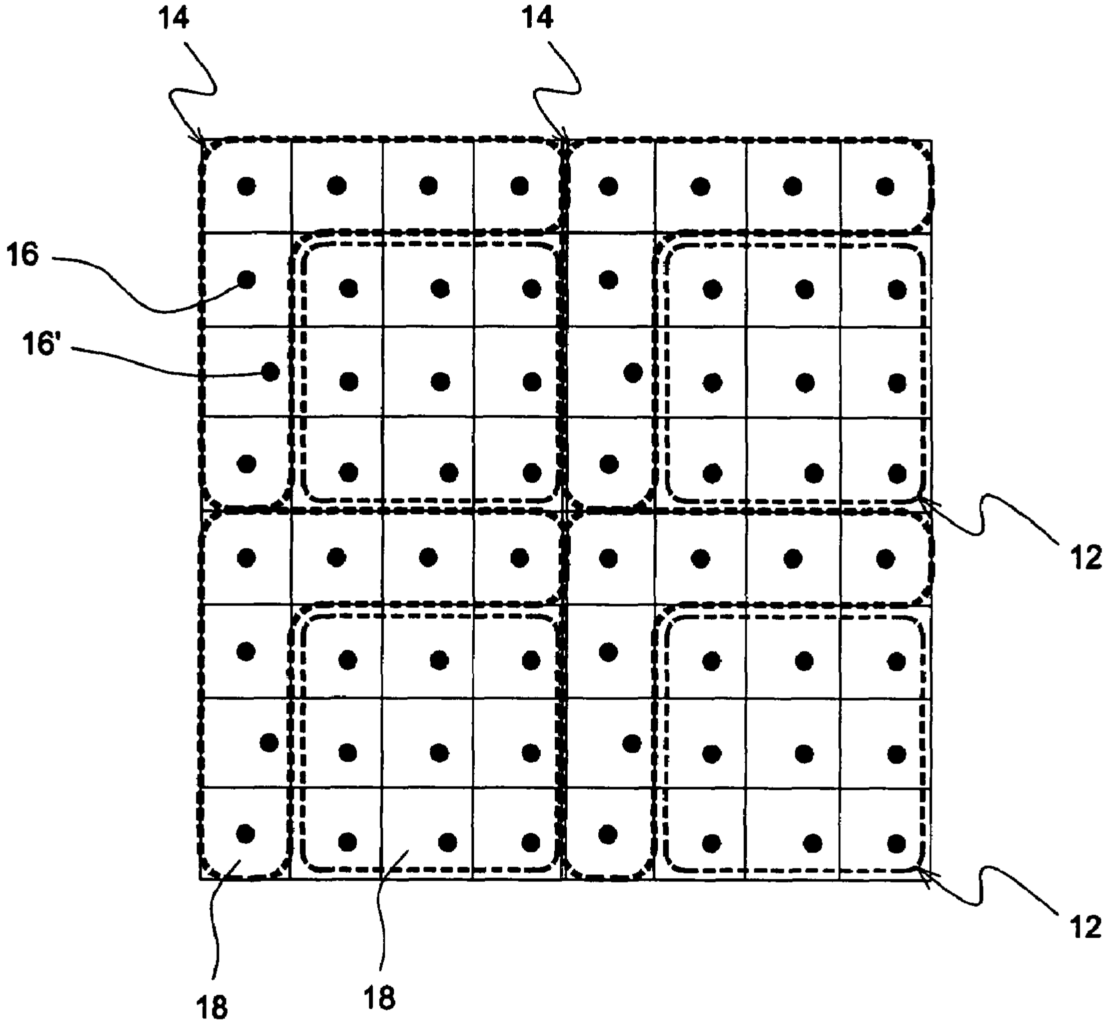
FIG. 8 shows a schematic diagram illustrating the functionality of the header part.

Since each graphical indicator 10 consists of a group of micro-units, the header part 14 is provided to distinguish adjacent graphical indicators 10 from each other. As shown in FIG. 8, the four graphical indicators 10 all have identical content parts 12 that represent the same index information, so their respective header parts 14 are the same. In other words, in case the index formation represented by a first graphical indicator 10 is different to that represented by a second graphical indicator 10, the two graphical indicators 10 can be clearly distinguished from each other by recognizing their respective different header parts.

Referring back to FIG. 5, in this embodiment, the header part 14 includes seven state zones 18 that form an L-shaped distribution positioned on two adjacent sides of the content part 12, and each state zone is spread with a dot 16. Thus, the seven dots 16 in a header part 14 together with the nine dots 16 in a content part 12 form a 4×4 matrix of a dot pattern. As shown in FIG. 5, each dot 16 in the header part 14 is typically provided in the center of the state zone to facilitate the recognition of the header part 14, but a dot 16' is shifted some distance relative to the center in order to provide the header part 14 with directionality. Hence, when the optical device (not shown) captures an enlarged image from the surface of an object, the recognized header part 14 may provide the graphical indicator 10 with a reference orientation to precisely fetch the candidate states of the content part 12.

Figure 9:
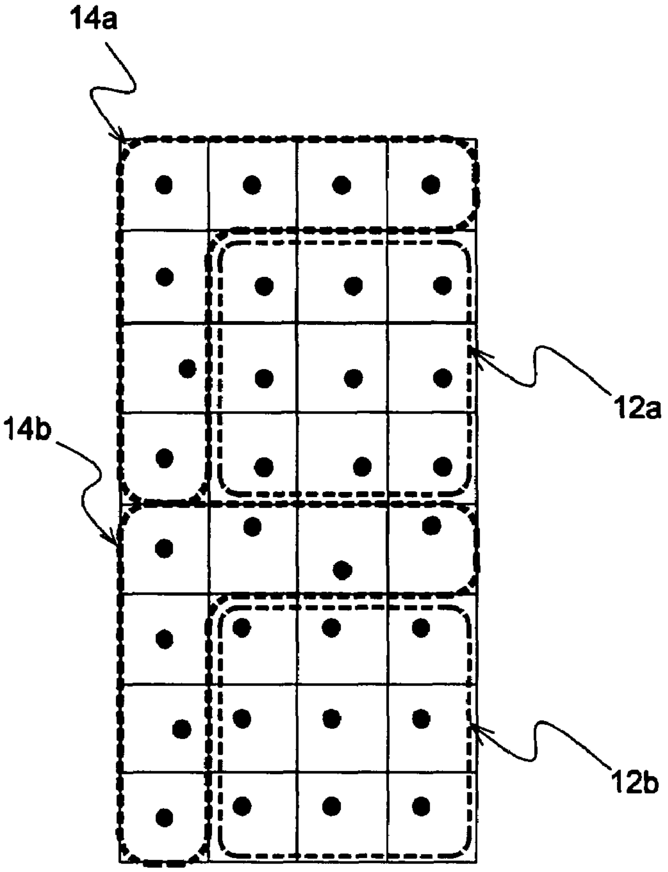
FIG. 9 shows a schematic diagram illustrating the functionality of the header part.
Figure 10:
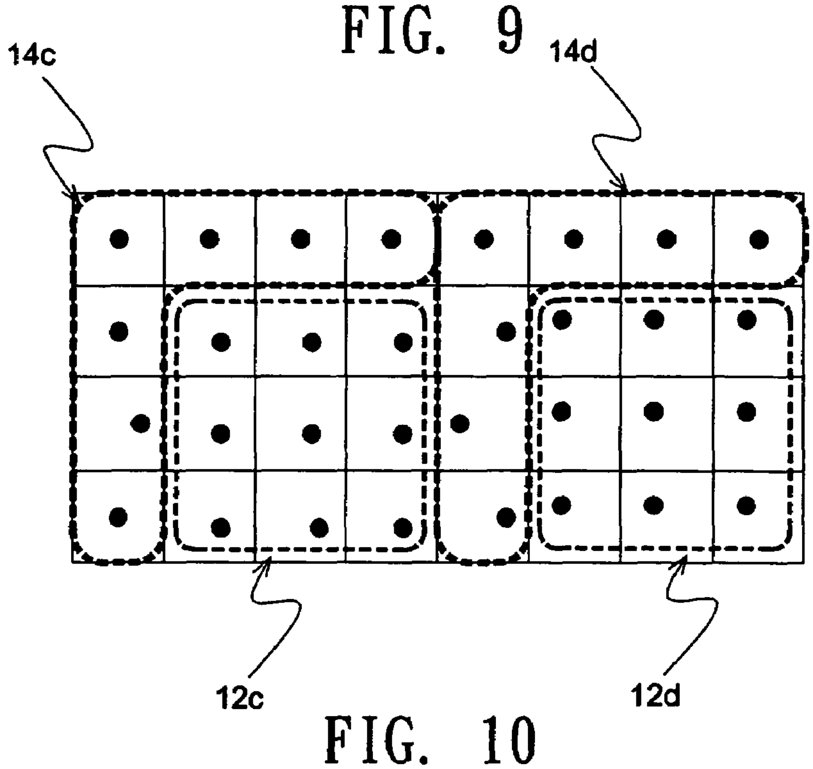
FIG. 10 shows a schematic diagram illustrating the functionality of the header part.

Further, different header parts 14 are made simply by adjusting the position of the dots 16, and different content parts 12 representing their respective index information can be distinguished from each other by the recognition of different header parts 14. For example, as shown in FIG. 9, two different header parts **14*a* and 14*b* that have different distributions of dots indicate the top and the bottom content parts 12*a* and 12*b* represent different index information. Alternatively, two different header parts 14*c* and 14*d* indicate the left and the right content parts 12*c* and 12*d*** represent different index information, as shown in FIG. 10.

In addition, in one embodiment the header part 14 are positioned on two adjacent sides of the content part 16 to define the distribution area of the dots of the content part 16. Thus, when the optical device (not shown) captures an enlarged image from the surface of an object, the candidate states of the content part 12 are precisely fetched even the enlarged image are distorted or deflected.

Figure 11A:
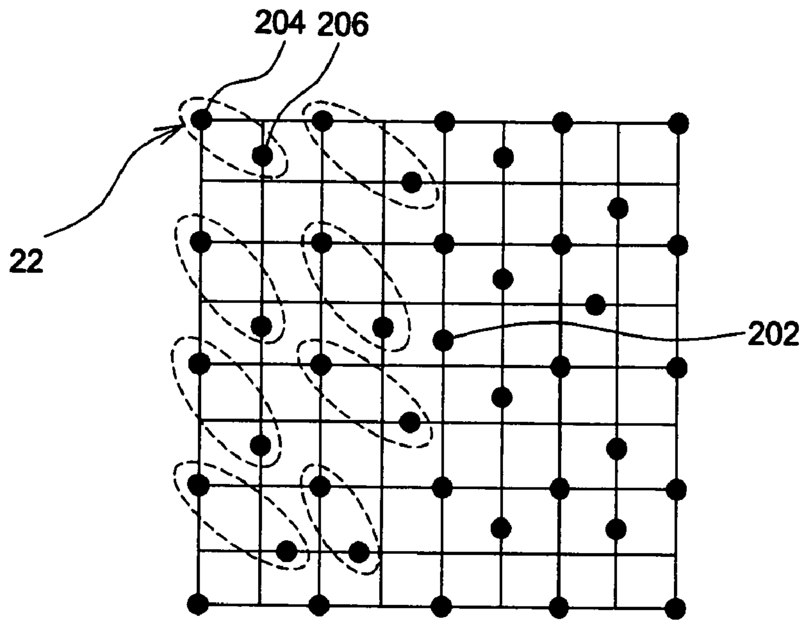
FIGS. 11A and 11B show schematic diagrams illustrating a comparison between the invention and the conventional design.
Figure 11B:
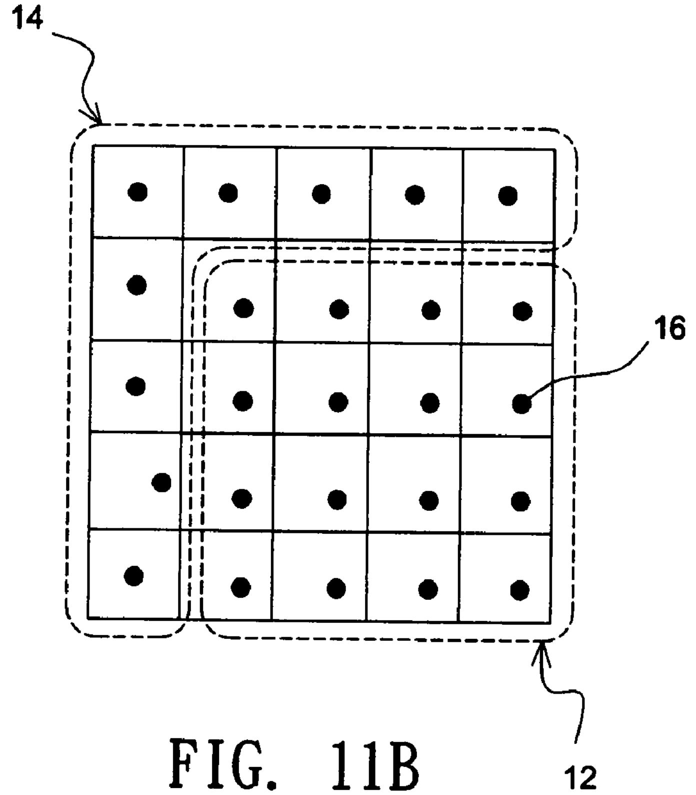

FIG. 11A shows a schematic diagram of a conventional design, and FIG. 11B shows a schematic diagram according to an embodiment of the invention. A comparison made between the invention and the conventional design is described below with reference to FIGS. 11A and 11B.

First, before the comparison is made, a valid dot ratio E of a graphical indicator 10 is defined as follows:

$$E=(\text{The number of dots in one graphical indicator used to represent index information})/(\text{The number of total dots in one graphical indicator})$$

Referring to FIG. 11A, in a conventional 5×5 matrix of dot pattern, each information dot 206 representing index information is surrounded by four grid points 204. In that case, a graphical indicator can be regarded as multiple dot pairs 22 each including a grid dot 204 and an information dot 206, so the valid dot ratio E of a conventional graphical indicator equals 50% and such percentage is a constant value without being influenced by the dimension of the dot matrix. In comparison, referring to FIG. 11B, as for a same 5×5 matrix of dot pattern, the information dots according to the invention are the total dots minus the dots in the header part 14 (i.e., the information dots are the dots in the content part 12), so the valid dot ratio E of a graphical indicator equals 64% (=(4*4)/(5*5)). Besides, such percentage will rise as the size of the dot matrix is increased. For example, as for a larger 10×10 matrix of dot pattern, the valid dot ratio E according to the invention equals 81% (=(9*9)/(10*10)). Accordingly, compared with the conventional design, the valid dot ratio E according to the invention is higher and will rise as the size of the dot matrix is increased. In other words, the graphical indicator design of the invention allows for a smaller number of dots (smaller dot distribution density) to represent the same data amount as in the conventional design.

As for the design of a graphical indicator, it is better to decrease the number of dots as far as possible, with the dimension of and the space between the graphical indicators taken into consideration, because a higher distribution density of dots may deteriorate the visual effect and raise the possibility of confusion between the graphical indicator and the primary pattern or text that carries main information. Since the graphical indicator design of the invention allows for a smaller number of dots (smaller dot distribution density) to represent the same data amount as in the conventional design, it may maintain better visual effect and avoid the confusion between the graphical indicator and the primary text or pattern. Further, in the conventional design shown in FIG. 11A, when the graphical indicators are spread on a confined surface area, a great amount of information to be carried may cause an excess distribution density of dots to result in a considerable small space between two adjacent dots. This often causes the difficulty of printing the graphical indicators and the errors in the analysis of the image captured by an optical device. However, the low dot distribution density achieved by the invention may solve this problem.

Figure 12A:
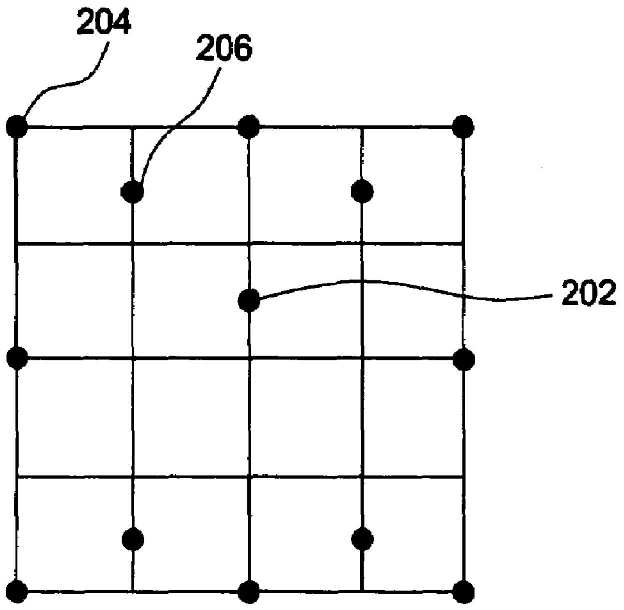
FIGS. 12A and 12B show schematic diagrams illustrating another comparison between the invention and the conventional design.
Figure 12B:
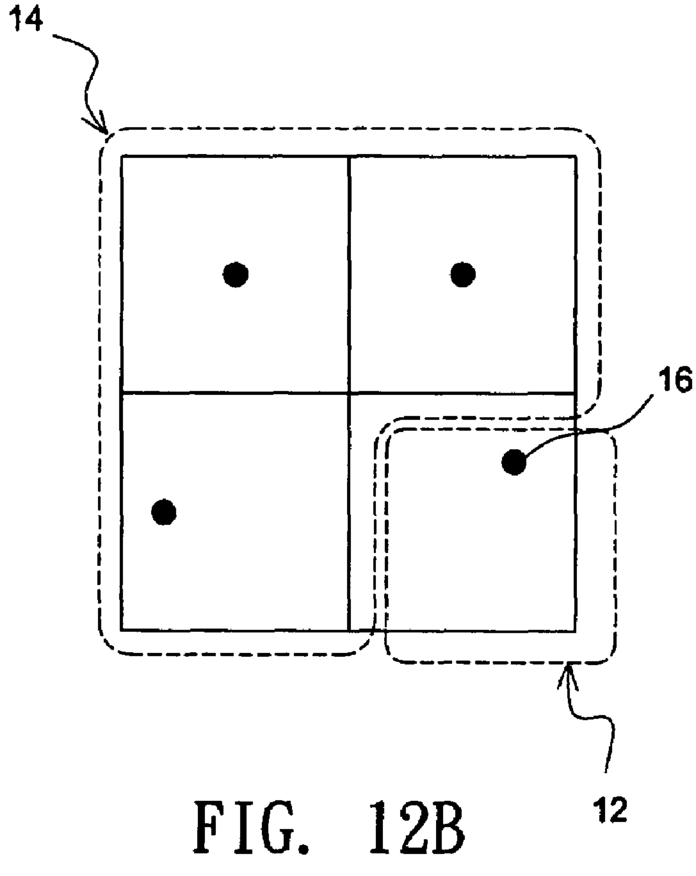

FIGS. 12A and 12B show schematic diagrams illustrating another comparison made between the invention and the conventional design. As shown in FIG. 12A, at least thirteen dots are needed to construct a smallest graphical indicator according to the conventional design, including a key dot 202, eight grid dots 204 surrounding the key dot 202, and four information dots 206. In comparison, as shown in FIG. 12B, only four dots 16 are needed to construct a smallest graphical indicator according to the invention. Thus, the dot arrangement of the invention provides more flexibility when the graphical indicators are affixed on the surface of an object and naturally helps to reduce the dot distribution density.

Figure 13:
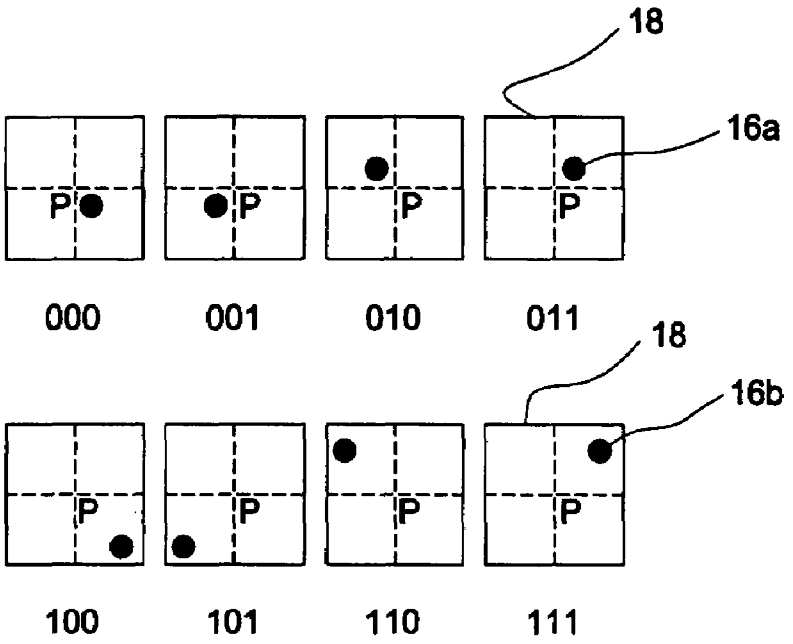
FIG. 13 shows a schematic diagram illustrating another embodiment of the invention.

FIG. 13 shows a schematic diagram illustrating another embodiment of the invention. As shown in FIG. 13, when a state zone 18 is equally divided into four hypothetical sections, each dot in the hypothetical section can be placed either near the center (such as the dot 16*a*) or far from the center (such as dot the 16*b*) of the state zone 18 to result in two candidate states. Thus, in case the dots 16*a* are placed near the center of the state zone 18, the dots 16*a* locate at lower-right, lower-left, upper-left and upper-right hypothetical section may respectively represent four bit values "000", "001 ", "010" and "011". Then, in case the dots 16*b* are placed far from the center of the state zone 18, the dots 16*b* locate at lower-right, lower-left, upper-left and upper-right hypothetical section may respectively represent four bit values "100", "101", "110" and "111". Through the arrangement, a single state zone 18 may form eight candidate states.

Figure 14:
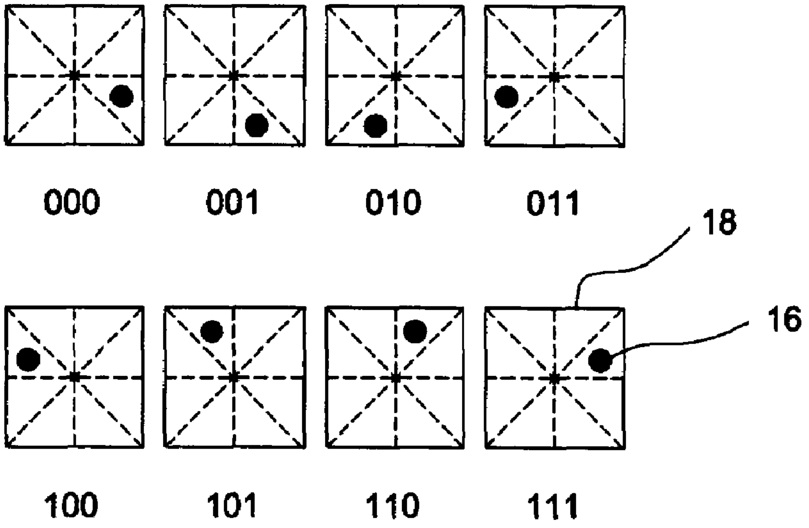
FIG. 14 shows a schematic diagram illustrating another embodiment of the invention.

Certainly, the number of the hypothetical sections equally divided from a single state zone is not limited to a specific one. For example, as shown in FIG. 14, a single state zone 18 may be equally divided into eight hypothetical sections, and the dot 16 is placed in any of the eight hypothetical sections to form eight candidate states.

Figure 15:
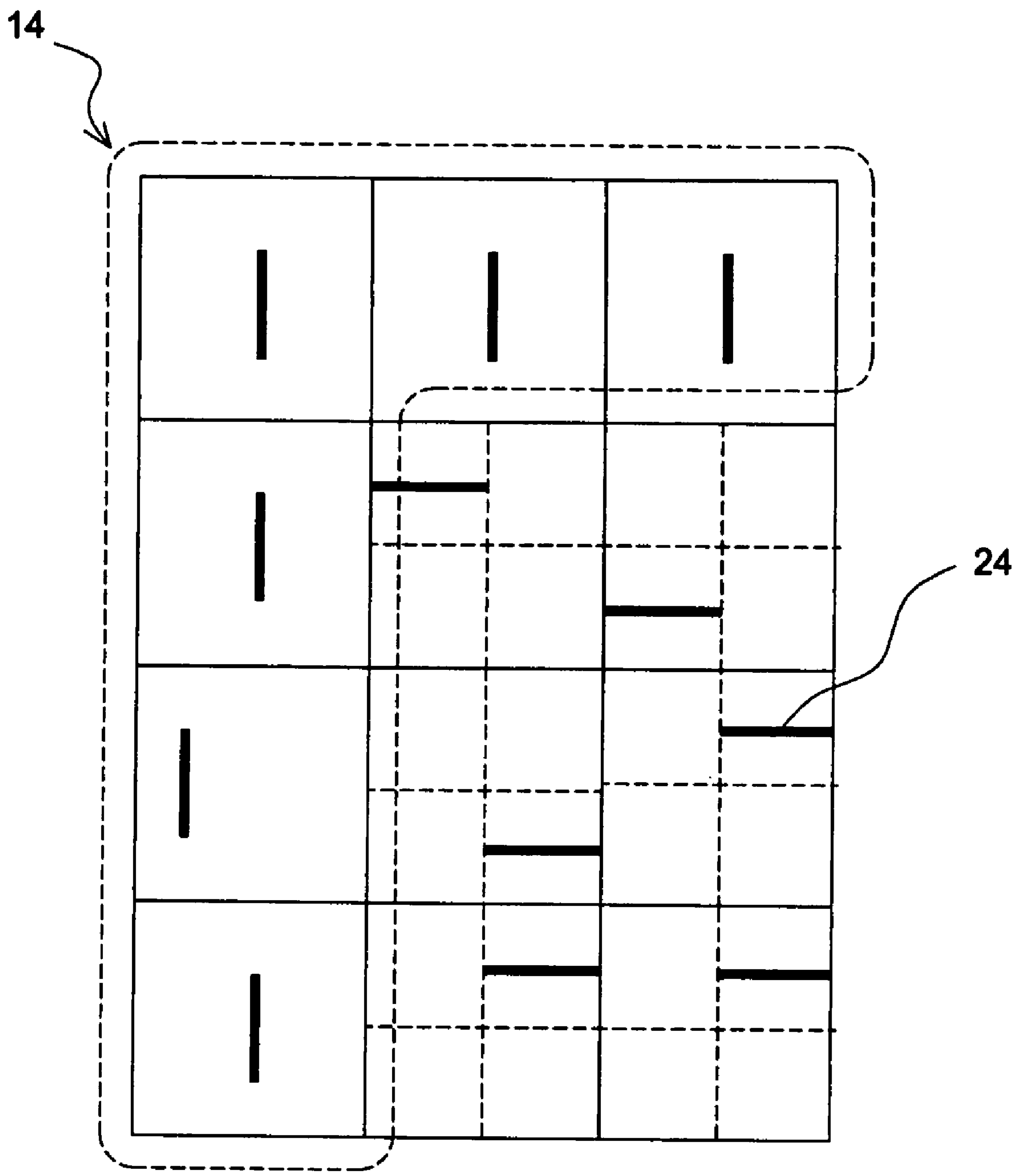
FIG. 15 shows a schematic diagram illustrating another embodiment of the invention.

Further, the micro-units that are arranged to form different candidate states are not limited to the dots exemplified in the above embodiments, as long as their existences can be clearly identified to recognize the candidate states. For example, a short line segment 24 may replace the dot 16 but achieve the same function of representing the candidate states. In addition, the number and arrangement of the micro-units in a graphical indicator 10 are not limited, and the shape of the state zone 18 and the graphical indicator 10 that consists of a two-dimensional array of state zones is not limited. For example, as shown in FIG. 15, the two-dimensional array of state zones in one graphical indicator 10 may be rectangular-shaped instead of square-shaped shown in FIG. 5.

Figure 16:
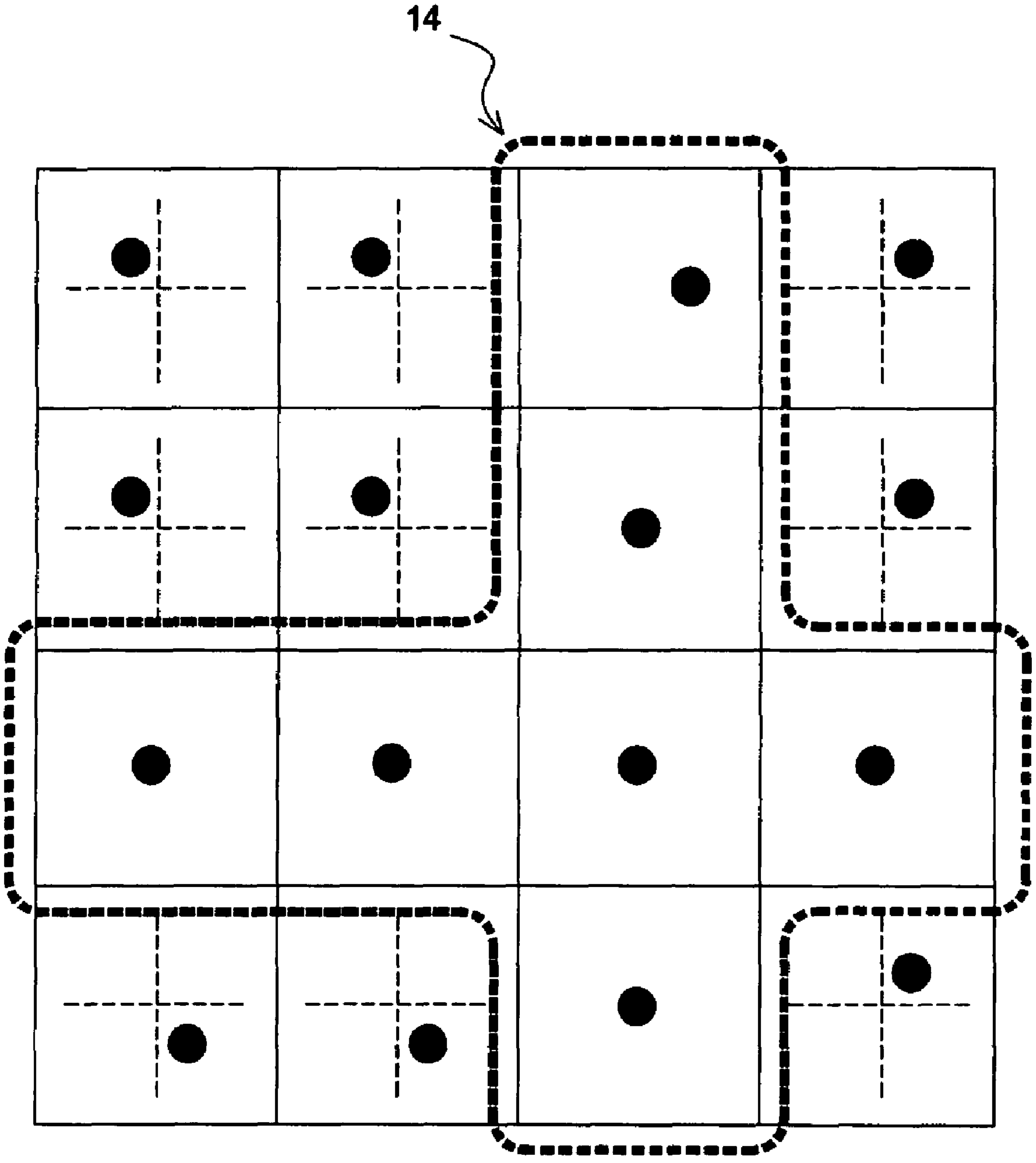
FIG. 16 shows a schematic diagram illustrating another embodiment of the invention.

FIG. 16 shows a schematic diagram illustrating another embodiment of the invention. Referring to FIG. 16, the header part 14 may be formed on the center portion of a graphical indicator 10 instead of the sides of the graphical indicator 10, as long as the function of providing a reference orientation is maintained.

While the invention has been described by way of examples and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A graphical indicator provided on the surface of an object to represent index information, the graphical indicator comprising: a content part spread with a plurality of micro-units, the content part being divided into a plurality of first state zones and each first state zone being spread with one micro-unit, wherein each first state zone is equally divided into multiple hypothetical sections and the micro-unit is placed in any of the hypothetical sections to form different candidate states; and a header part spread with a plurality of micro-units and divided into a plurality of second state zones, wherein each second state zone is spread with one micro-unit not used to carry information and the position of each micro-unit serves as the header information used to recognize the graphical indicator; wherein the first state zones and the second state zones are two complementary parts of an array of N rows (N≧2) and M columns (M≧2), the number of the micro-units is N×M, and the second state zones of the header part are arranged into an outermost row and an outermost column of the array to define the distribution area of the content part; and wherein at least one micro-unit in the header part is placed in a position within one state zone different to the position of the rest of the micro-units in the header part.

2. The graphical indicator as claimed in claim 1, wherein each state zone is equally divided into four hypothetical sections, and the micro-unit is placed in any of the four hypothetical sections to represent a numerical value of the index information.

3. The graphical indicator as claimed in claim 1, wherein each header part is spread with seven micro-units and each content part is spread with nine micro-units and divided into nine state zones, with each state zone being equally divided into four hypothetical sections and the micro-unit being placed in any of the four hypothetical sections to form 262144candidate states in one content part.

4. The graphical indicator as claimed in claim 3, wherein 65536 candidate states out of the 262144 candidate states are taken to correspond to 65536 code points of the Unicode standard.

5. The graphical indicator as claimed in claim 1, wherein at least one micro-unit in the header part is shifted some distance relative to the center of a state zone, and each of the rest micro-units in the header part are provided in the center of a state zone.

6. The graphical indicator as claimed in claim 1, wherein the micro-units of the content part are used to carry information.

7. The graphical indicator as claimed in claim 1, wherein the header part is positioned on two adjacent sides of the content part to form an L-shaped distribution.

8. The graphical indicator as claimed in claim 1, wherein the header part has a specific arrangement of micro-units in relation to the index information represented by the content part.

9. The graphical indicator as claimed in claim 1, wherein the micro-units are dot-shaped or line-shaped.

10. The graphical indicator as claimed in claim 1, wherein each state zone is equally divided into eight hypothetical sections.

11. The graphical indicator as claimed in claim 1, wherein the micro-units in one hypothetical section are placed near or far from the center of the state zone that contains the hypothetical section to form two candidate states.

12. The graphical indicator as claimed in claim 1, wherein the graphical indicator coexists with a pattern or text that represents main information on the surface of the object.

13. The graphical indicator as claimed in claim 1, wherein the micro units in the outermost row or in the outermost column of the array are arranged to substantially form at least one line, and at least one micro-unit is placed to deviate from the line to provide the header information used to recognize the graphical indicator.

14. The graphical indicator as claimed in claim 13, wherein the micro-unit deviates from the line in a direction perpendicular to the extending direction of the line.

15. The graphical indicator as claimed in claim 13, wherein the header part is positioned on two adjacent sides of the content part to form an L-shaped distribution.

16. The graphical indicator as claimed in claim 13, wherein at least one micro-unit in the header part is placed in a position within one state zone different to the position of the rest micro-units in the header part.

17. The graphical indicator as claimed in claim 16, wherein at least one micro-unit in the header part is shifted some distance relative to the center of a state zone, and each of the rest micro-units in the header part are provided in the center of a state zone.

18. The graphical indicator as claimed in claim 13, wherein each state zone is equally divided into eight hypothetical sections.

19. The graphical indicator as claimed in claim 13, wherein the micro-units in one hypothetical section are placed near or far from the center of the state zone that contains the hypothetical section to form two candidate states.

20. The graphical indicator as claimed in claim 13, wherein each header part is spread with seven micro-units and each content part is spread with nine micro-units and divided into nine state zones, with each state zone being equally divided into four hypothetical sections and the micro-unit being placed in any of the four hypothetical sections to form 262144 candidate states in one content part.

21. The graphical indicator as claimed in claim 20, wherein 65536 candidate states out of the 262144 candidate states are taken to correspond to 65536 code points of the Unicode standard.

* * * * *